United States Patent
Nakamura et al.

[11] Patent Number: 5,887,643
[45] Date of Patent: Mar. 30, 1999

[54] CONDUCTOR CASTING APPARATUS FOR A SQUIRREL-CAGE ROTOR OF AN INDUCTION MOTOR

[75] Inventors: Kosei Nakamura; Yukio Katsuzawa; Minoru Kasama; Yasuyuki Nakazawa, all of Minamitsuru-gun, Japan

[73] Assignee: Fanuc Ltd, Minamitsuru, Japan

[21] Appl. No.: 776,018

[22] PCT Filed: May 20, 1996

[86] PCT No.: PCT/JP96/01326

§ 371 Date: Jan. 17, 1997

§ 102(e) Date: Jan. 17, 1997

[87] PCT Pub. No.: WO96/37037

PCT Pub. Date: Nov. 21, 1996

[30] Foreign Application Priority Data

May 19, 1995 [JP] Japan ................................. 7/121874

[51] Int. Cl.[6] .......................... B22D 33/04; B22D 17/04; B22D 17/24
[52] U.S. Cl. .......................... 164/340; 164/341; 164/312; 164/314; 164/319; 164/320; 164/333; 164/334
[58] Field of Search ...................... 164/340, 341, 164/312, 314, 319, 320, 334, 333, 112, 120, 137

[56] References Cited

U.S. PATENT DOCUMENTS

| | | |
|---|---|---|
| 1,555,285 | 9/1925 | Hoey . |
| 5,067,550 | 11/1991 | Maekawa et al. ................ 164/120 |
| 5,538,067 | 7/1996 | Nakamura et al. ................ 164/333 |

FOREIGN PATENT DOCUMENTS

| | | |
|---|---|---|
| 1247503 | 10/1960 | France . |
| 2264614 | 10/1975 | France . |
| 63-314152 | 12/1988 | Japan . |
| 3-254349 | 11/1991 | Japan . |
| 6-225505 | 8/1994 | Japan . |
| 2032334 | 5/1980 | United Kingdom . |

*Primary Examiner*—Patrick Ryan
*Assistant Examiner*—I. H. Lin
*Attorney, Agent, or Firm*—Staas & Halsey

[57] ABSTRACT

A rotor core (12) of a squirrel-cage rotor of an induction motor is housed in a recess (14) of a mold (18) of a conductor casting apparatus (10). A composite cylinder device (68) is fixed on the upper side of the mold (18) or on the side remoter from the pouring gate thereof, and the rotor core 12 is held in a predetermined position in the recess 14 by one piston (70). The other piston (72) locally pressurizes a molten metal that fills an end-connector ring cavity (66) defined between the rotor core (12) and the recess (14) on the side remoter from the pouring gate.

6 Claims, 6 Drawing Sheets

CONDUCTOR CASTING APPARATUS FOR A SQUIRREL-CAGE ROTOR OF AN INDUCTION MOTOR

CROSS-REFERENCE TO RELATED APPLICATION

This application is a continuous application of International Patent Application No. PCT/JP 96/01326, filed May 20, 1996,

TECHNICAL FIELD

The present invention relates to a conductor casting apparatus for molding a conductor of a squirrel-cage rotor of an induction motor to be integrally with a rotor core, and more particularly, to a conductor casting apparatus provided with means for additionally pressurizing a molten metal that fills an end-connector ring cavity between a mold and a rotor core on the side remoter from the pouring gate of the mold, in order to eliminate blowholes formed in a molded conductor.

BACKGROUND ART

As shown in FIGS. 3A and 3B, a rotor core 12 of a squirrel-cage rotor used in an induction motor is formed of a laminate of magnetic sheets, such as silicon steel sheets, and comprises a plurality of conductor rods 46 arranged individually in a plurality of slots 44 that are formed in the axial direction along the substantially cylindrical outer peripheral edge, and a pair of end-connector rings 48 which are arranged individually at the axially opposite ends of the core 12 to short-circuit the conductor rods 46 one another.

These conductor rods 46 and the pair of end-connector rings 48 are integrally molded by casting, such as aluminum die casting. A cylindrical axial hole 50 in the center of the rotor core 12 which is integral with molded conductor portion is fixed on a shaft 52 by shrink fitting or the like, whereupon the well-known squirrel-cage rotor is formed.

This conductor molding method is excellent in productivity and facilitates molding of a conductor in a desired shape, so that it has an advantage of being able to improve the characteristics of the motor. Heretofore, it has been widely used for a small-sized induction motors, in particular.

Conductor molding by casting, however, may bring on a problem that shrinkage cavity or gas cavity is caused in a molded conductor. According to the die casing method in which a molten metal, such as aluminum, is loaded at high speed and under high pressure, in particular, the molten metal is liable to form a turbulent flow and trap gas as it is loaded, so that development of blowholes is unavoidable. In the squirrel-cage rotor, moreover, the radial sectional area of each conductor rod is much smaller than the radial sectional area of each end-connector ring. During the casting operation, therefore, the molten metal first solidifies in the slots (in which the conductor rods are arranged to form the squirrel-cage rotor) that axially penetrate the laminate of magnetic sheets, such as silicon steel sheets, so that a sufficient pressure cannot be transmitted to those end-connector ring portions which solidify after a delay (especially those end-connector ring portions which are located on the side remoter from the pouring gate), and blowholes tend to be easily formed. Since a conductor having blowholes is low in mechanical strength, it is difficult to apply a squirrel-cage rotor including such a conductor to a high-torque induction motor or high-speed induction motor with a speed of tens of thousands of rpm.

Already proposed is a casting method in which a molten metal filling an end-connector ring cavity between a mold and a rotor core is locally pressurized independently of the filling pressure, in order to prevent the formation of blowholes in the conductor (end-connector ring in particular). According to this method, the molten metal is loaded from one end-connector ring cavity, which communicates with a pouring gate, into the other end-connector ring cavity, on the side remoter from the pouring gate, through a plurality of slots, and first solidifies in the slots with a small sectional area, thereby cutting off applied pressure from the end-connector ring cavity on the side remoter from the pouring gate. As this is done, pressure is additionally applied to the molten metal in the end-connector ring cavity on the side remoter from the pouring gate before this molten metal solidifies. Thus, the end-connector ring on the side remoter from the pouring gate can be molded under a desired pressure, so that the formation of blowholes can be prevented.

This local-pressurization casting method requires use of local pressurization means that can apply a uniform pressure to the whole end-connector ring on the side remoter from the pouring gate. For ease of manufacture, however, many molds for squirrel-cage rotors are generally constructed so as to be able to open and close in the same direction as the axial direction of the rotor core. In installing the local pressurization means on the side remoter from the pouring gate of one such mold, the installation space for the local pressurization means must be provided in the mold so as not to influence external structures, such as a mold supporting structure. Thus, the mold is increased in thickness and external dimensions, so that its manufacture is difficult, and its practicability is ruined.

Further, the molds for squirrel-cage rotors must be provided with a retaining structure for firmly holding the rotor core in a predetermined position in the mold, resisting the molten metal filling pressure, on the side remoter from the pouring gate. How to arrange this retaining structure, together with the aforesaid local pressuring means, orderly on the side remoter from the pouring gate of the mold is also a problem to be solved.

Also proposed is a local pressurization method in which the gate-side portion of the mold is designed so as to be movable in the axial direction, and the movable pouring gate-side portion of the mold is axially moved together with the rotor core by the filling pressure after the molten metal is loaded from the pouring gate-side end-connector ring cavity into the end-connector ring cavity on the side remoter from the pouring gate through the slots, whereby pressure is additionally applied to the end-connector ring on the side remoter from the pouring gate. Although the local pressurization means need not be located on the side remoter from the pouring gate, according to this method, the construction of the mold is complicated, and moreover, a special casting machine (injection molding machine) with a very high pressure is needed to move a movable part of the mold together with the rotor core, so that the installation cost is very high.

DISCLOSURE OF THE INVENTION

The object of the present invention is to provide a conductor casting apparatus, which is provided with local pressurization means capable of preventing a conductor, especially an end-connector ring on the side remoter from the pouring gate, from suffering blowholes by using a casting machine with an ordinary injection pressure, without increasing the external dimensions of a mold or complicating the structure, whereby a high-strength, high-performance squirrel-cage rotor that is applicable to a high-torque or high-speed induction motor can be manufactured.

In order to achieve the above object, a conductor casting apparatus for a squirrel-cage rotor of an induction motor according to the present invention, which is used to mold a plurality of axially extending conductor rods and a pair of end-connector rings for short-circuiting the respective axially opposite ends of the rods, to be integral with a rotor core by casting, is arranged so that its mold has a recess containing the rotor core and a pouring gate, communicating with a first end-connector ring cavity defined between the wall of the recess and one axial-end face of the rotor core, and adapted to open and close in the radial direction with respect to the rotor core, and its composite cylinder device includes a first piston located adjacent to a second end-connector ring cavity, defined between the wall surface of the recess and the other axial end face of the rotor core on the side remoter from the pouring gate, and fixedly holding the rotor core in the recess, and a second piston for additionally pressurizing a molten metal filling the second end-connector ring cavity, the first and second pistons being arranged concentrically for independent actuation.

According to the present invention arranged in this manner, the first piston of the composite cylinder device firmly fixedly holds the rotor core in the recess of the mold against the molten metal filling pressure, during casting operation. The molten metal supplied to the first end-connector ring cavity through the pouring gate flows through the rotor core and reaches the second end-connector ring cavity. Before it solidifies in the second end-connector ring cavity, the molten metal solidifies in the rotor core, thereby forming the conductor rods in advance and cutting off applied pressure from the second end-connector ring cavity. Then, the second piston of the composite cylinder device is actuated to pressurize the molten metal in the second end-connector ring cavity additionally. Thereupon, the molten metal solidifies under a desired pressure, so that end-connector rings free from blowholes are formed.

Since the mold opens and closes in the radial direction with respect to the rotor core, an installation space for the composite cylinder device can be easily secured on that side of the mold which is remoter from the pouring gate. Since the first and second pistons are arranged concentrically for independent actuation, moreover, there is no possibility of the thickness and external dimensions of the mold being increased or the structure being complicated. Since the molten metal filling pressure is not used to move the mold or the core, furthermore, a casting machine with an ordinary injection pressure can be employed.

BEST MODE FOR CARRYING OUT THE INVENTION

Figure 1:
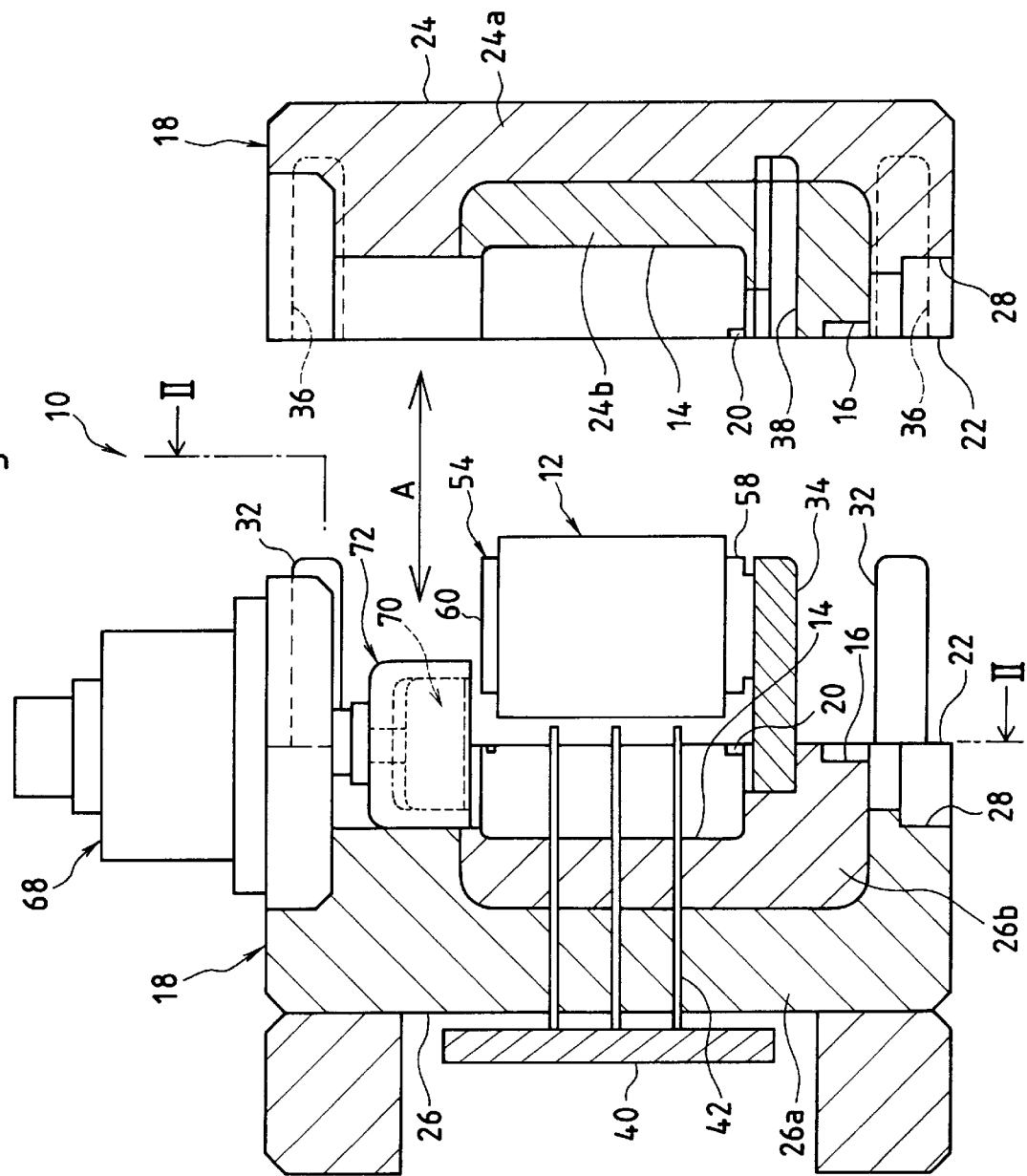
FIG. 1 is a front sectional view showing a conductor casting apparatus according to an embodiment of the present invention with its mold open.
Figure 2:
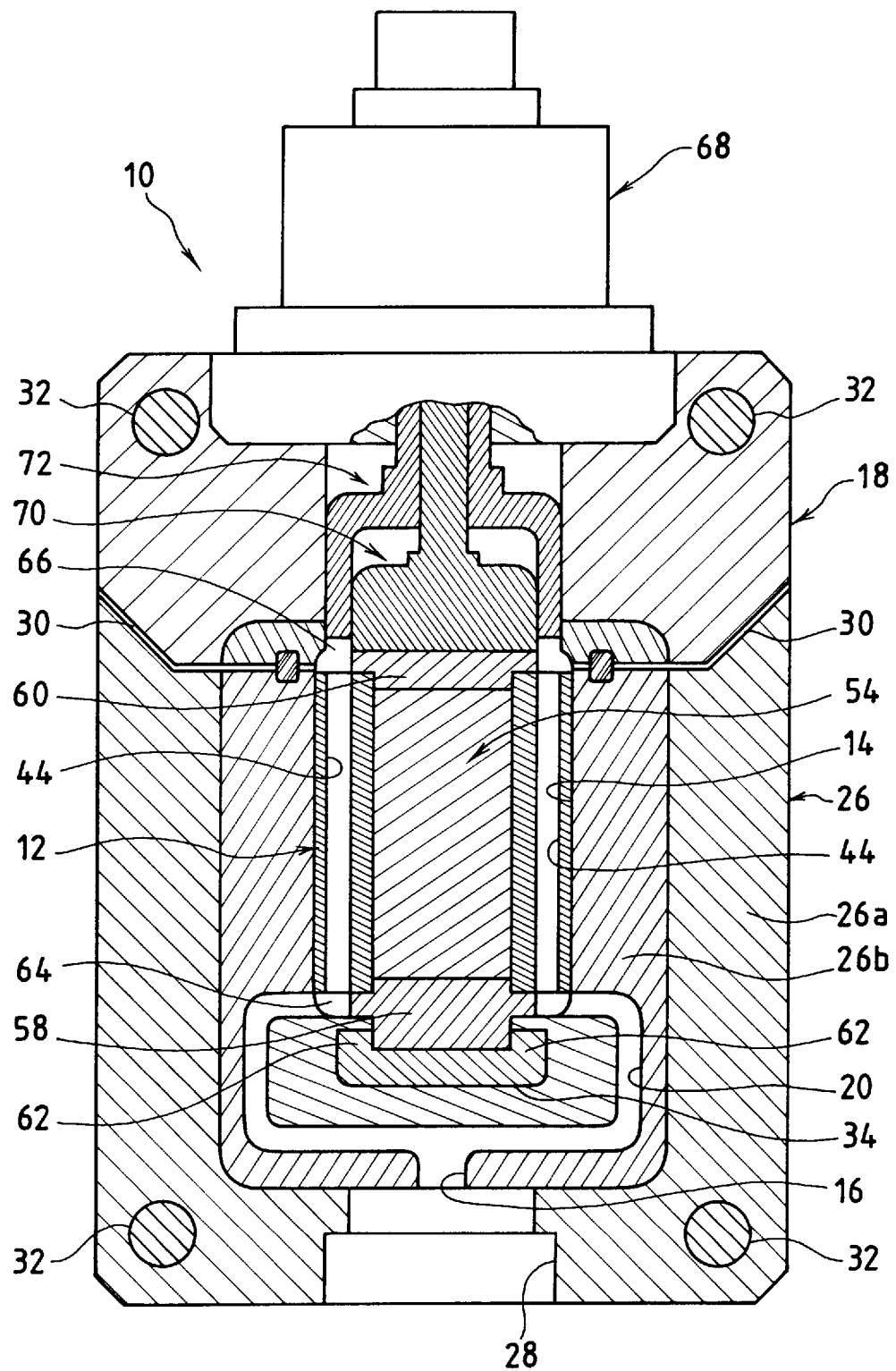
FIG. 2 is a side view, partially in section, taken along line II—II, showing the conductor casting apparatus with a rotor core housed in a recess.

Referring to FIGS. 1 and 2, there is shown one embodiment of a conductor casting apparatus for a squirrel-cage rotor of an induction motor according to the present invention.

The conductor casting apparatus 10 comprises a mold 18 provided with a recess 14, which houses a rotor core 12 of the squirrel-cage rotor, and a pouring gate 16 that communicates with the recess 14. The recess 14 and the pouring gate 16 are connected by means of a sprue runner 20 that diverges substantially symmetrically in two directions. The mold 18 is divided into two parts, that is, a stationary part 24 and a movable part 26, by parting faces 22 that extend in the vertical (longitudinal) direction. The movable part 26 can reciprocate in the horizontal (crosswise) direction (arrow A) with respect to the stationary part 24. Thus, the mold 18 is constructed so as to open and close in the radial direction with respect to the rotor core 12.

The recess 14, pouring gate 16, and sprue runner 20 are cut in the stationary part 24 and the movable part 26 from the parting faces 22 so that they have substantially the same shape, and form one mold cavity and a sprue runner system when the two parts 24 and 26 are combined together. In the present embodiment, the stationary part 24 and the movable part 26 are formed of outside main molds 24a and 26a and inside sub-molds (liners) 24b and 26b, respectively, and the recess 14, pouring gate 16, and sprue runner 20 are formed in the sub-molds 24b and 26b.

The pouring gate 16 is located right under the recess 14, and the sprue runner 20 opens in the peripheral wall of the lower end of the recess 14. Underlying the pouring gate 16, a receiving section 28, which is to be fitted with the injection tip of a casting machine, such as a die casting machine, is formed in the respective main molds 24a and 26a of the stationary part 24 and the movable part 26. Further, a plurality of gas vents 30 for discharging gas from the cavity during casting operation are formed in the stationary part 24 and the movable part 26 so as to extend along the parting faces 22. The gas vents 30 penetrate the main molds 24a and 26a and the sub-molds 24b and 26b, and open in the peripheral wall of the upper end of the recess 14 and the respective outer surfaces of the main molds 24a and 26a.

The movable part 26 is provided with a plurality of guide pins 32 projecting from the parting face 22 of the main mold 26a and a core supporting rail 34 projecting from the parting face 22 of the sub-mold 26b. The stationary part 24 is provided with guide grooves 36 and a rail receiving groove 38 that are formed recessed from the parting face 22 in positions corresponding to the guide pins 32 and the core supporting rail 34, respectively. Further, the movable part 26 is furnished with an extruding plate 40 and a plurality of extruding pins 42 for extruding the core with a molded conductor portion from the recess 14.

Figure 3A:
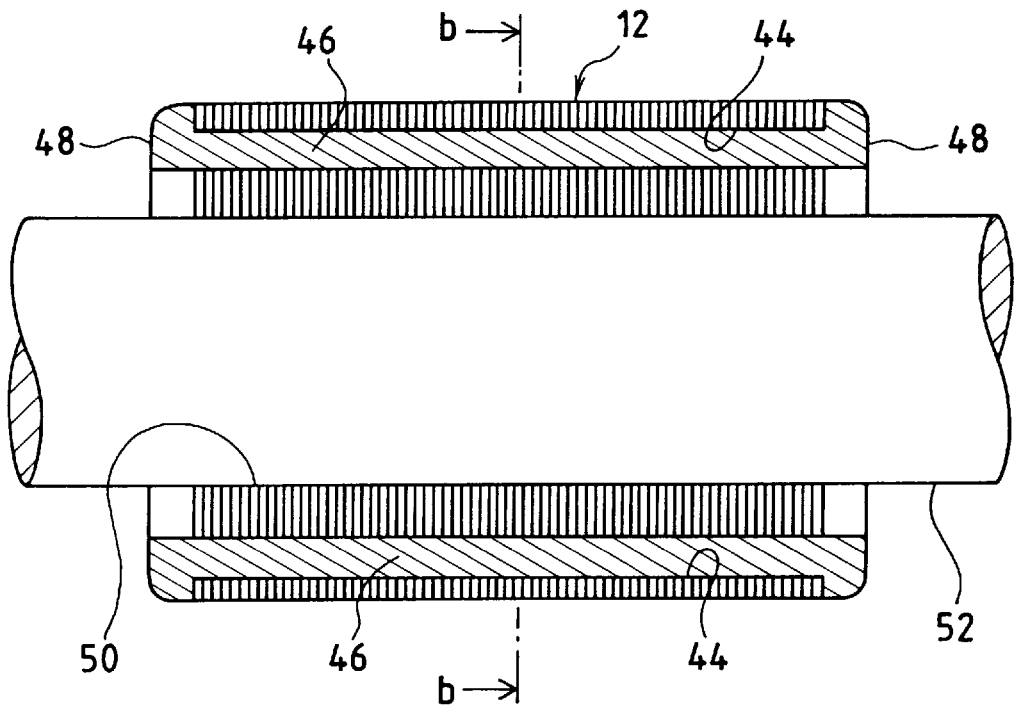
FIG. 3A is a front view of a squirrel-cage rotor manufactured by using the conductor casting apparatus of FIG. 1.
Figure 3B:
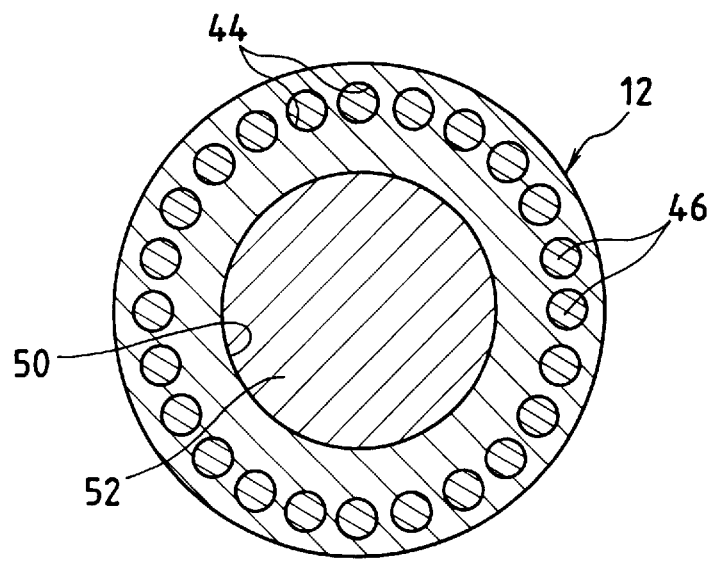
FIG. 3B is a side sectional view of the squirrel-cage rotor taken along line b—b of FIG. 3A.
Figure 4:
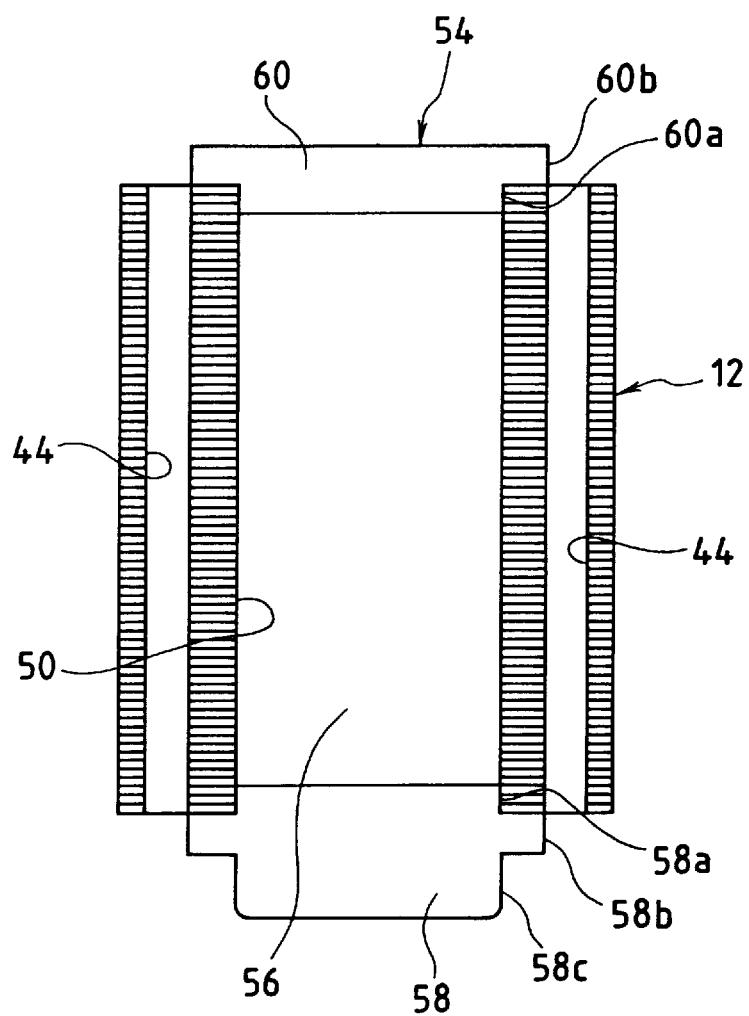
FIG. 4 is a front sectional view showing the rotor core of the squirrel-cage rotor of FIGS. 3A and 3B fixed to a jig.

The rotor core 12 (see FIGS. 3A and 3B) of the squirrel-cage rotor, which is formed of a laminate of magnetic sheets, is stationed in the recess 14 of the mold 18 so as to be fixedly supported by a jig 54 shown in FIG. 4. The jig 54 is provided with a mandrel section 56, which is inserted in an axial hole 50 of the rotor core 12, and a pair of fastening sections 58 and 60 connected individually to the axially opposite ends of the mandrel section 56 by fixing means such as bolts (not shown) and integrally holding the rotor core 12. These fastening sections 58 and 60 include substantially cylindrical small-diameter portions 58*a* and 60*a*, inserted in the axial hole 50 and in contact with the mandrel section,56, and substantially cylindrical large-diameter portions 58*b* and 60*b*, extending from the small-diameter portions 58*a* and 60*a* and engaging the axially opposite end faces of the rotor core 12, respectively. The outside diameter of the large-diameter portions 58*b* and 60*b* is smaller than the diameter of a circle that connects the respective radially outermost edges of slots 44 of the rotor core 12 and larger than the diameter of the diameter of the axial hole 50.

The rotor core 12, which is fixedly supported by the jig 54, is placed on the core supporting rail 34 of the movable part 26 in a manner such that its axis is directed vertically, as shown in FIG. 1. The core supporting rail 34 is formed with a pair of ridges 62 (FIG. 2) for guiding the rotor core 12 into the recess 14, and the lower fastening section 58 slidably engages the ridges 62. In the embodiment of FIG. 4, the fastening section 58 is provided with a second small-diameter portion 58*c* that extends further from the large-diameter portion 58*b*, and this small-diameter portion 58*c* engages the pair of ridges 62 of the core supporting rail 34. The axial end face of the small-diameter portion 58*c* of the fastening section 58 and the axial end face of the large-diameter portion 60*b* of the upper fastening section 60 are substantially flat surfaces such that the rotor core 12 can be fixed tight in the mold 18.

The rotor core 12, fixedly supported by the jig 54, is inserted into the recess 14 of the movable part 26, and the movable part 26 is moved and attached to the stationary part 24. Thereupon, the rotor core 12 is housed in position with its outer peripheral surface in substantially uniformly intimate contact with the peripheral wall of the recess 14. In this state, a first annular end-connector ring cavity 64 (FIG. 2) for molding, an end-connector ring 48 is formed, in the lower end region of the recess 14, between the wall surface of the recess 14 and the axial end face of the rotor core 12 and the outer peripheral surface of the large-diameter portion 58*b* of the fastening section 58. Likewise, a second annular end-connector ring cavity 66 (FIG. 2) for molding another end-connector ring 48 is formed, in the upper end region of the recess 14, between the wall surface of the recess 14 and the axial end face of the rotor core 12 and the outer peripheral surface of the large-diameter portion 60*b* of the fastening section 60. The first and second end-connector ring cavities 64 and 66 communicate with the slots 44 of the rotor core 12.

The conductor casting apparatus 10 according to the present invention comprises a composite cylinder device 68, which functions both as retaining means for firmly holding the rotor core 12 in a predetermined position in the recess 14 against the molten metal filling pressure, and as local pressurization means for locally pressurizing a molten metal, which fills the conductor molding cavity, independently of the filling pressure. As shown in FIGS. 1 and 2, the composite cylinder device 68 is fixedly supported on the upper end of the movable part 26 on the side remoter from the pouring gate, and is provided with a first piston 70 for fixing the rotor core 12 in the recess 14 and a second piston 72 for additionally pressurizing the molten metal filling the second end-connector ring cavity 66.

Figure 5:
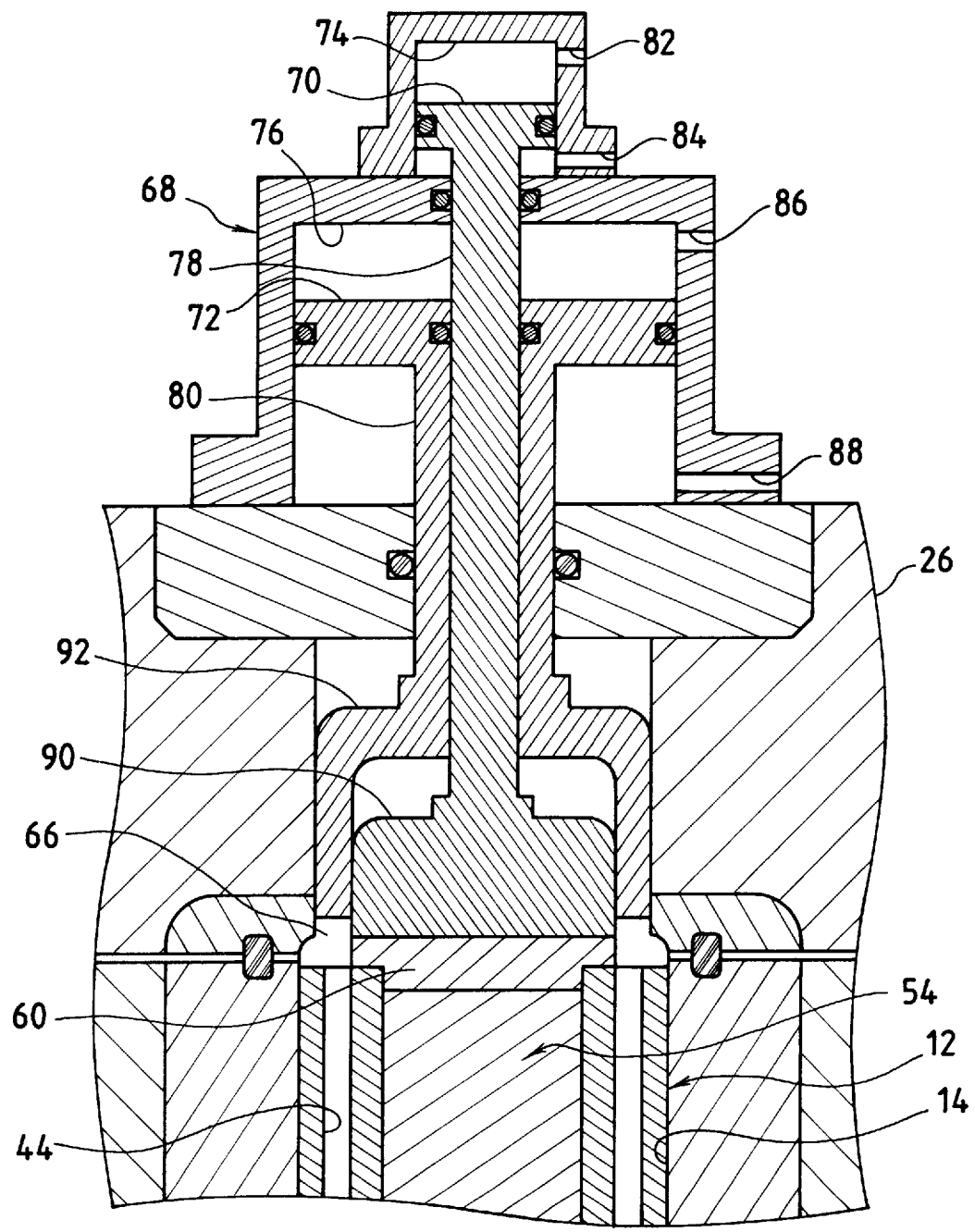
FIG. 5 is a partial enlarged side sectional view showing a composite cylinder device of the conductor casting apparatus of FIG. 1.

As is conceptually shown in FIG. 5, the composite cylinder device 68 has the first and second pistons 70 and 72 arranged substantially concentrically for independent actuation. Thus, the composite cylinder device 68 is provided with a first chamber 74 containing the first piston 70 and a second chamber 76 containing the second piston 72, which are isolated from each other lest any circulation of a fluid be caused between them. A piston rod 78 of the first piston 70 penetrates a piston rod 80 of the second piston 72 substantially concentrically like a telescope. The first and second chambers 74 and 76 have ports 82 and 84 and ports 86 and 88, respectively, outside the respective strokes of the first and second pistons 70 and 72, and individually constitute independent double-acting cylinders. A drive source for the composite cylinder device 68 may be hydraulic or pneumatic.

A push flange 90 having a substantially flat axial end face is attached to the distal end of the piston rod 78 of the first piston 70. When the first piston 70 advances, the axial end face of the push flange 90 abuts against the axial end face of the large-diameter portion 60*b* of the fastening section 60 of the jig 54 that supports the rotor core 12 in the recess 14 (see FIG. 5). Thus, the rotor core 12 is held firmly in the predetermined position in the recess 14. A pressure then supplied to the first chamber 74 through the port 82 is high enough to retain the rotor core 12, resisting the molten metal filling pressure.

A hollow cylindrical push ring 92 having a substantially flat annular axial end face is attached to the distal end of the piston rod 80 of the second piston 72. The push ring 92 houses the push flange 90 of the first piston 70 substantially concentrically. The axial end face of the push ring 92 is located opposing the second end-connector ring cavity 66. When the second piston 72 retreats, the axial end face of the push ring 92 is located at an axial distance a little greater than the axial dimension of the completed end-connector ring 48 from the axial end face of the rotor core 12 (see FIG. 5). When the second piston 72 advances, the axial end face of the push ring 93 pressurizes the molten metal in the second end-connector ring cavity 66 additionally and generally uniformly. A pressure then supplied to the second chamber 76 through the port 86 is high enough to prevent the molten metal from suffering blowholes as it solidifies in the second end-connector ring cavity 66.

The following is a description of a procedure for molding the conductor portion to be integral with the rotor core 12 by using the conductor casting apparatus 10 having the aforementioned construction.

First, the mold 18 is opened, and the first and second pistons 70 and 72 of the composite cylinder device 68 are located in their respective retreated positions. Then, the rotor core 12, which is fixedly supported by the jig 54, is placed on the distal end portion of the core supporting rail 34 of the movable part 26 in a manner such that its axis is directed vertically with the fastening section 58 downward. In this state, the movable part 26 is moved and attached to the stationary part 24, and the rotor core 12 is loaded into the recess 14. In order to simplify the procedure, in this case, it is advisable to insert the rotor core 12 first into the recess 14 of the stationary part 24 as the movable part 26 moves and cause it to be pressed by the wall of the recess 14 of the stationary part 24 to be guided on the core supporting rail 34 so that the insertion of the movable part 26 into the recess 14 is completed when the movable part 26 is attached entirely to the stationary part 24.

After the movable part 26 is mounted on the stationary parts 24 and then the rotor core 12 is housed entirely in the recess 14, a given pressure is supplied to the first chamber 74 of the composite cylinder device 68 through the port 82, and the first piston 70 is advanced so that the rotor core 12 is held firmly between the push flange 90 and the core supporting rail 34. In this state, the injection tip of a casting machine such as a die casting is attached to the receiving section 28, and the molten metal is injected into the pouring gate 16. The molten metal, injected under a given pressure, flows through the pouring gate 16 into the first end-connector ring cavity 64, runs against the gravity in the slots 44 of the rotor core 12, and further flows into the second end-connector ring cavity 66, thereby entirely filling the conductor molding cavity in the recess 14. As this is done, the gas in the conductor molding cavity is discharged from the mold through the gas vents 30.

Before the pressure is fully transmitted to the molten metal that was introduced into the second end-connector connector ring cavity 66, the molten metal that fills the slots 44 of the rotor core 12 starts to solidify first, thereby cutting off pressure application to the second end-connector ring cavity 66. After the second end-connector ring cavity 66 is entirely filled with the molten metal, therefore, a given pressure is supplied to the second chamber 76 of the composite cylinder device 68 through the port 86, and the second piston 72 is advanced so that the molten metal in the second end-connector ring cavity 66 is pressurized by the push ring 92. Thus, the end-connector ring 48 on the side remoter from the pouring gate is also formed under a sufficient pressure, so that a high-strength conductor portion that is free from gas defects, such as sink marks, pores, etc. The timing for the second piston 72 to be actuated to pressurize the molten metal in the second end-connector ring cavity 66 can be obtained experimentally on the basis of the molten metal filling speed, the respective capacities of the slots and the end-connector ring cavities 64 and 66, the speed of the second piston 72, etc.

After the molding of a plurality of conductor rods 46 and the pair of end-connector rings 48 for the rotor core 12 is thus completed, pressure is supplied to the first and second chambers 74 and 76 of the composite cylinder device 68 through the ports 84 and 88, respectively, whereupon the first and second pistons 70 and 72 are retreated. Further, the movable part 26 is moved to open the mold 18, and the extruding plate 40 is actuated so that the rotor core 12 is extruded toward the distal end portion of the core supporting rail 34 by the extruding pins 42. Then, the jig 54 is disengaged from the rotor core 12, and finishing work, such as removal of flashes from the conductor portion is made to the rotor core 12. Thereafter, the rotor core 12 is fixed to a shaft 52, whereupon the squirrel-cage rotor shown in FIG. 3 is formed.

In the conductor casting apparatus 10 according this embodiment, as described above, the composite cylinder device 68 which has core retaining function and local pressurization function for the molten metal is located on the side remoter from the pouring gate of the mold 18 that opens and closes in the radial direction with respect to the rotor core 12, so that the conductor, especially the end-connector ring on the side remoter from the pouring gate, can be prevented from suffering blowholes, and a high-performance squirrel-cage rotor can be manufactured without increasing the thickness and external dimensions of the mold 18 or complicating the structure. Moreover, the necessary molten metal filling pressure for casting is as high as the pressure for conventional casting that involves no local pressurization, and the casting machine used can employ an ordinary injection pressure, so that the installation cost can be prevented from jumping.

In a mold structure in which molten metal flows in the antigravity direction from under a cavity into the cavity, as in the mold 18 of the conductor casting apparatus 10, a plurality of independent cavities (e.g., slots 44) can be filled with the molten metal under a uniform influence of the gravity, so that the molten metal can be prevented from flowing ill-balanced and trapping air Thus, this structure is optimum in casting a conductor of a squirrel-cage rotor. Moreover, a mold structure in which the rotor core 12 is housed with its axis directed vertically and the stationary part and the movable part are separated in the horizontal direction at their vertical parting faces, is advantageous in that the installation space for the composite cylinder device according to the present invention can be secured with ease, and that the gas vents can be located in optimum positions, as in the case of the aforementioned embodiment.

Figure 6:
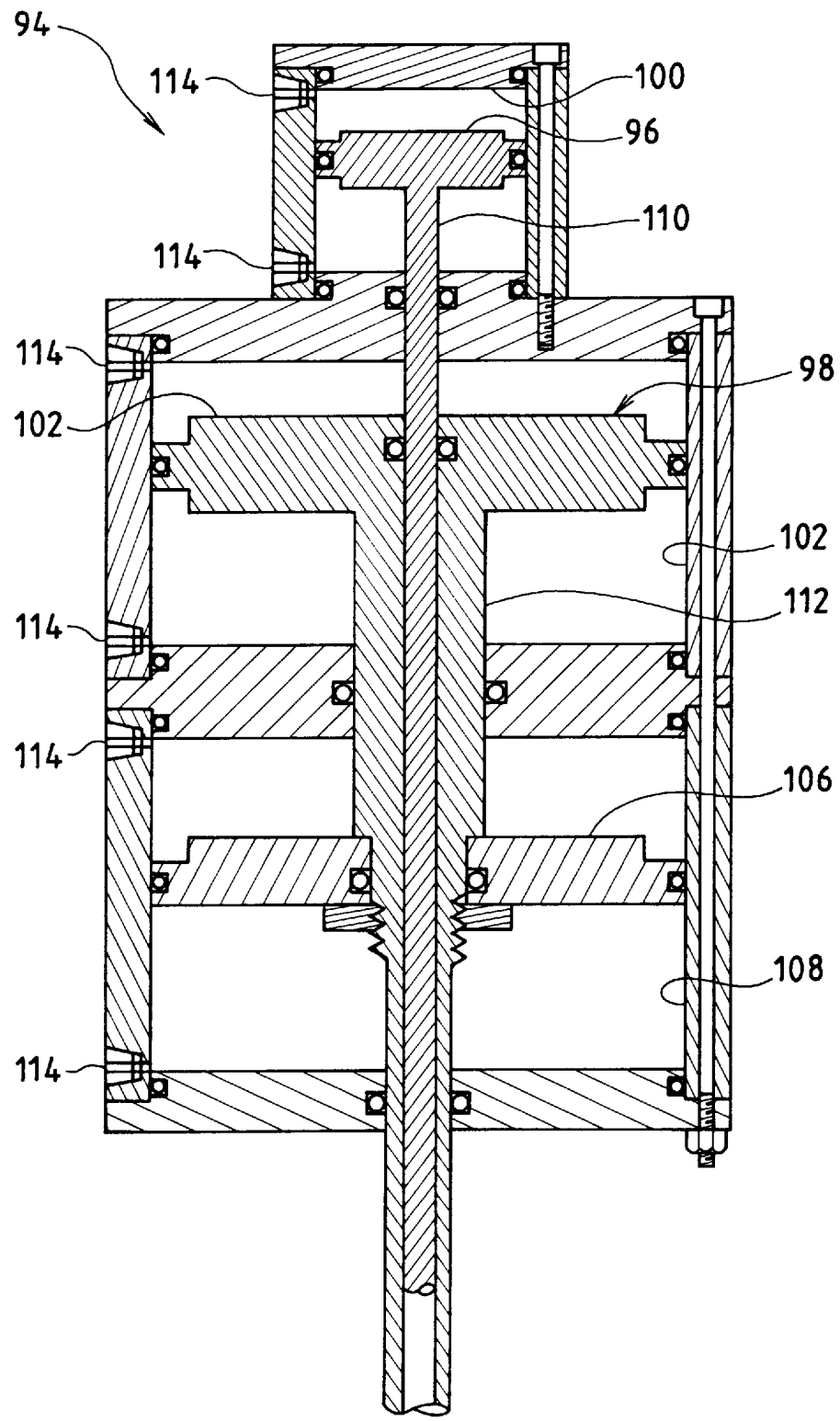
FIG. 6 is a side sectional view of a modification of the composite cylinder device of FIG. 5.

In the composite cylinder device 68 according to the foregoing embodiment, the pressure to be supplied to the second piston 72 for the local pressurization of the molten metal is about five to ten times as high as the pressure to be supplied to be to the first piston 70 for the retention of the core. Depending on the diameter of the rotor to be cast, therefore, the second piston 72 is much greater in size than the one illustrated, and sometimes is not favorable in practical use. In such a case, it is advisable to use a composite cylinder device 94 that has a second piston of a tandem structure, as shown in FIG. 6.

The composite cylinder device 94, like the composite cylinder device 68, is fixedly supported on the upper end of a mold on the side remoter from the pouring gate, and is provided with a first piston 96 for holding a rotor core and a second piston 98 for locally pressurizing a molten metal. The first and second pistons 96 and 98 are arranged substantially concentrically for independent actuation. A first chamber 100 housing the first piston 96, a second chamber 104 housing a first piston element 102 of the second piston 98, and a third chamber 108 housing a second piston element 106 of the second piston 98 are isolated from one another lest any circulation of a fluid be caused between them. A piston rod 110 of the first piston 96 penetrates a piston rod 112 of the second piston 98 substantially concentrically like a telescope. The first, second, and third chambers 100, 104 and 108 have their respective ports 114 outside the respective strokes of the first piston 96 and the first and second piston elements 102 and 106 of the second piston 98.

Since the composite cylinder device 94, which is provided with the tandem-type second piston 98, has a core retaining function and also a local pressurization device for the molten metal, gas defects of a conductor portion can be prevented without increasing the external dimensions of the mold or complicating the structure. Since the radial dimension of the second piston can be made smaller than that of the second piston 72 of FIG. 5, moreover, this arrangement is advantageous particularly in the case where the conductor casting apparatus is subject to dimensional restrictions.

According to the present invention, as described above, the composite cylinder device, which has core retaining function and also local pressurization function for the molten metal, is incorporated in the mold that opens and closes in the radial direction with respect to the rotor core. Accordingly, the conductor, especially the end-connector ring on the side remoter from the pouring gate, can be prevented from suffering blowholes as it is molded to be integral with the rotor core by using the casting machine with the ordinary injection pressure, without increasing the thickness and external dimensions of the mold or complicating the structure. Thus, a high-strength, high-performance squirrel-cage rotor that is applicable to a high-torque or high-speed induction motor can be manufactured at low cost.

We claim:

1. A conductor casting apparatus for a squirrel-cage rotor of an induction motor, which is used for molding a conductor comprising a plurality of axially extending conductor rods and a pair of end-connector rings for short-circuiting the respective axially opposite ends of the rods, to be integral with a rotor core by casting, comprising:

a mold having a recess for housing the rotor core and a pouring gate, opening into a first end-connector ring cavity defined between the wall surface of said recess and one axial end face of the rotor core, and adapted to open and close in the radial direction with respect to the rotor core; and a composite cylinder device including a first piston located adjacent to a second end-connector ring cavity, defined between the wall surface of said recess and the other axial end face of the rotor core on the side remoter from the pouring gate, and fixedly holding the rotor core in said recess, and a second piston for additionally pressurizing a molten metal filling the second end-connector ring cavity, the first and second pistons being arranged concentrically for independent actuation.

2. A conductor casting apparatus according to claim 1, wherein said second piston of said composite cylinder device has a tandem structure composed of a first piston element and a second piston element connected to the first piston element, the first and second piston elements being housed, respectively, in first and second chambers isolated from one another lest any circulation of a fluid be caused between the two.

3. A conductor casting apparatus according to claim 1, wherein a jig is fitted in an axial hole of the rotor core housed in the recess of the mold, and said first piston fixedly holds the rotor core in the recess by engaging one end face of the jig.

4. A conductor casting apparatus according to claim 3, wherein said jig includes a mandrel section to be inserted in the axial hole of the rotor core and fastening sections connected individually to the opposite ends of the mandrel section and each having a large-diameter portion in engagement with an axial end face of the rotor core corresponding thereto.

5. A conductor casting apparatus according to claim 1, wherein gas vents are formed in parting faces of the mold adapted to open and close in the radial direction with respect to the rotor core.

6. A conductor casting apparatus according to claim 1, wherein one half of said mold, adapted to open and close in the radial direction, is provided, on the pouring-gate side thereof, with a core supporting rail for carrying the rotor core thereon, and the other half of the mold is provided with a rail receiving groove for receiving said core supporting rail.

* * * * *